United States Patent
Hong et al.

(10) Patent No.: US 6,178,070 B1
(45) Date of Patent: Jan. 23, 2001

(54) MAGNETIC WRITE HEAD AND METHOD FOR MAKING SAME

(75) Inventors: Liubo Hong; Zhupei Shi, both of San Jose, CA (US)

(73) Assignee: Read-Rite Corporation, Milpitas, CA (US)

(*) Notice: Under 35 U.S.C. 154(b), the term of this patent shall be extended for 0 days.

(21) Appl. No.: 09/248,572

(22) Filed: Feb. 11, 1999

(51) Int. Cl.$^7$ ................ G11B 5/147; G11B 5/39
(52) U.S. Cl. ............ 360/317; 360/123; 360/126; 360/119
(58) Field of Search ................ 360/126, 125, 360/317, 313, 119, 123

(56) References Cited

U.S. PATENT DOCUMENTS

| | | | |
|---|---|---|---|
| 4,246,620 | 1/1981 | Kaminaka et al. | 360/127 |
| 4,318,148 | 3/1982 | Kaminaka et al. . | |
| 4,409,632 | 10/1983 | Kanai et al. . | |
| 4,416,056 | 11/1983 | Takahashi | 29/603 |
| 4,490,760 | 12/1984 | Kaminaka et al. . | |
| 4,639,808 | 1/1987 | Thornley | 360/121 |
| 4,639,811 | 1/1987 | Diepers et al. | 360/125 |
| 4,642,720 | 2/1987 | Kishine et al. . | |
| 4,677,036 | 6/1987 | Nakamura et al. | 428/694 |
| 4,759,118 | 7/1988 | Nakashima . | |
| 4,760,481 | 7/1988 | Yuito et al. . | |
| 4,841,624 | 6/1989 | Togawa et al. | 29/603 |
| 4,860,139 | 8/1989 | Hamilton | 360/126 |
| 4,860,140 | 8/1989 | Momata et al. . | |
| 4,933,209 | 6/1990 | Anthony et al. | 427/116 |
| 4,943,882 | 7/1990 | Wada et al. | 360/126 |
| 5,016,342 | 5/1991 | Pisharody et al. | 29/603 |
| 5,034,089 | 7/1991 | Dee et al. | 156/633 |
| 5,116,719 | 5/1992 | Gau . | |
| 5,168,408 | * 12/1992 | Lazzari | 360/113 |
| 5,173,826 | 12/1992 | Bischoff . | |
| 5,189,580 | 2/1993 | Pisharody et al. . | |

(List continued on next page.)

FOREIGN PATENT DOCUMENTS

| | | |
|---|---|---|
| 1-082312 | * 3/1989 | (JP) . |
| 5-298624 | * 11/1993 | (JP) . |
| 6-176319 | * 6/1994 | (JP) . |
| 7-110920 | * 4/1995 | (JP) . |
| 7-302410 | * 11/1995 | (JP) . |

* cited by examiner

Primary Examiner—William Klimowicz
(74) Attorney, Agent, or Firm—Hickman Coleman Hughes, LLP

(57) ABSTRACT

A magnetoresistive device for recording data includes a first pole connected to a second pole that is above the first pole. Above the first pole is a first conductive coil imbedded in a first insulation material, with at least a portion of the first conductive layer disposed below all of the second pole. The first and second poles have a first and second pole tip portion, respectively, between which is defined a write gap. A first pole pedestal, connected to the first pole at the first pole tip portion, and a second pole pedestal, connected to the second pole at the second pole tip portion, can be located between the first and second poles. Also, additional conductive coils can be included above the first conductive coil.

11 Claims, 13 Drawing Sheets

U.S. PATENT DOCUMENTS

| | | | |
|---|---|---|---|
| 5,270,895 | 12/1993 | Ruigrok et al. | 360/126 |
| 5,283,942 | 2/1994 | Chen et al. . | |
| 5,331,493 | 7/1994 | Schwarz | 360/113 |
| 5,349,745 | 9/1994 | Kawabe et al. . | |
| 5,435,053 | 7/1995 | Krounbi et al. | 29/603 |
| 5,438,247 | 8/1995 | Krounbi et al. . | |
| 5,452,164 | 9/1995 | Cole et al. . | |
| 5,455,730 | 10/1995 | Dovek et al. | 360/113 |
| 5,476,804 | 12/1995 | Lazzari | 437/51 |
| 5,555,147 | 9/1996 | Maruyama | 360/113 |
| 5,566,442 | 10/1996 | Gaud et al. | 29/603.14 |
| 5,568,335 | 10/1996 | Fontana et al. . | |
| 5,621,593 | 4/1997 | Kitajima | 360/113 |
| 5,639,509 | 6/1997 | Schemmel . | |
| 5,649,351 | 7/1997 | Cole et al. . | |
| 5,653,013 | 8/1997 | Gill et al. | 29/603.14 |
| 5,673,474 | 10/1997 | Watterson et al. | 29/603.14 |
| 5,691,867 | 11/1997 | Onuma et al. | 360/126 |
| 5,700,380 | 12/1997 | Krounbi et al. | 216/22 |
| 5,742,458 | 4/1998 | Koike et al. . | |
| 5,751,522 | 5/1998 | Yamada et al. . | |
| 5,768,070 * | 6/1998 | Krounbi et al. | 360/113 |
| 5,777,829 | 7/1998 | Voldman et al. . | |
| 5,793,578 * | 8/1998 | Heim et al. | 360/126 |
| 5,926,350 * | 7/1999 | Chiu et al. | 360/121 |
| 6,043,959 * | 3/2000 | Crue et al. | 360/113 |

MAGNETIC WRITE HEAD AND METHOD FOR MAKING SAME

CROSS-REFERENCE TO RELATED APPLICATIONS

This application is related to the following U.S. patent application having application Ser. No. 09/249,539 (Attorney Docket Number READP014), filed on the same day as the instant application, and entitled "Very Low Magnetic Write Head and Method for Making Same." This application is hereby incorporated by reference.

BACKGROUND OF THE INVENTION

This invention relates generally to magnetic disk data storage systems, and more particularly to magnetic write heads and methods for making same.

Magnetic disk drives are used to store and retrieve data for digital electronic apparatuses such as computers. In FIGS. 1A and 1B, a magnetic disk data storage systems 10 of the prior art includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20, and at its other end to a read/write head or transducer 24. The transducer 24 (which will be described in greater detail with reference to FIG. 1C) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 1C depicts a magnetic read/write head 24 including a read element 26 and a write element 28. The edges of the read element 26 and write element 28 also define an air bearing surface ABS, in a plane 29, which faces the surface of the magnetic disk 16.

The read element 26 includes a first shield 30, an intermediate layer 32, which functions as a second shield, and a read sensor 34 that is located between the first shield 30 and the second shield 32. The most common type of read sensor 34 used in the read/write head 24 is the magnetoresistive (MR or GMR) sensor which is used to detect magnetic field signals from a magnetic medium through changing resistance in the read sensor.

The write element 28 is typically an inductive write element. The write element 28 includes the intermediate layer 32, which functions as a first pole, and a second pole 38 disposed above the first pole 32. The first pole 32 and the second pole 38 are attached to each other by a backgap portion 40, with these three elements collectively forming a yoke 41. Above and attached to the first pole 32 at a first pole tip portion 43, is a first pole pedestal 42 abutting the ABS. In addition, a second pole pedestal 44 is attached to the second pole 38 at a second pole tip portion 45 and aligned with the first pole pedestal 42. This portion of the first and second poles 42 and 44 near the ABS is sometimes referred to as the yoke tip region 46. A write gap 36 is formed between the first and second pole pedestals 42 and 44 in the yoke tip region 46. The write gap 36 is filled with a non-magnetic material. This non-magnetic material can be either integral with (as is shown here) or separate from a first insulation layer 47 that lies below the second yoke 38 and extends from the yoke tip region 46 to the backgap portion 40. Also included in write element 28 is a conductive coil 48, formed of multiple winds, that is positioned within a dielectric medium 50 that lies above the first insulation layer 47. The configuration of the conductive coil 48 can be better understood with reference to a plan view of the read/write head 24 shown in FIG. 1D taken along line 1D—1D of FIG. 1C. As is well known to those skilled in the art, these elements operate to magnetically write data on a magnetic medium such as a magnetic disk 16.

In FIG. 1E, a view taken along line 1E—1E of FIG. 1C (i.e., perpendicular to the plane 29) further illustrates the structure of the read/write head 24 at the ABS. As can be seen from this view and in the view of FIG. 1C, the first and second pole pedestals 42 and 44 have substantially equal widths of Wp which are smaller than the width W of the first and second poles 32 and 38 in the yoke tip region 46. A critical parameter of a magnetic write element is a trackwidth defined by the geometries at the ABS. In this configuration, the trackwidth of the write element 28 is substantially equal to the width Wp. An inductive write head such as that shown in FIGS. 1C–1E operates by passing a writing current through the conductive coil 48.

Because of the magnetic properties of the yoke 41, a magnetic flux is induced in the first and second poles 32 and 38 by write currents in coil 48. The more winds between the first and second poles 42 and 44, the larger the magnetic flux that can be induced. The write gap 36 allows the magnetic flux to fringe out from the yoke 41 (thus forming a fringing gap field) and to cross a magnetic recording medium that is placed near the ABS. In this way, the write element performance is directly driven by the strength of this gap field. Thus, with a particular current, more winds results in a higher write element performance due to higher magnetic flux.

More winds in the conductive coil 48 could be included between the first and second poles by increasing the yoke length YL. Unfortunately, the recording speed is inversely related to the yoke length YL. In particular, as shown in FIG. 1F, increasing yoke length increases flux rise time, i.e., the time that it takes the magnetic flux to be generated in the poles by the writing current. The higher the flux rise time, the slower the write element can record data on a magnetic media (i.e., a lower data rate). As shown by the graph of FIG. 1F, with increasing yoke length YL, the flux rise time increases thereby decreasing recording speed of the write element.

Again referring to FIG. 1C, another way that more winds could be included in the write element could be forming additional winds in one or more additional conductive coils (not shown) above the conductive coil 48. However, this increases the stack height SH of the write element (i.e., causes a higher topography). Unfortunately, the reliability of the write element is inversely related to the stack height SH. For example, with higher topography the formation of the second pole, such as by sputtering or plating, can lead to undesirable material properties.

Another problem which increases with increasing stack height is cracking of the write element due to thermal expansion and thermal coefficient mismatch. For example, when adjacent insulation layers are formed of different materials that have different thermal coefficients, during heating the two materials may expand at different rates. When the stack height increases, the attendant geometries result in increasing likelihood of separation between the second pole 38 and the second pole pedestal 44. Regardless of the mechanism of reduced reliability, this results in undesirable lower production yield.

Alternatively, a larger writing current can be used with fewer winds to achieve the same performance. Unfortunately, however, higher current can cause higher heat levels, thus increasing problems associated with higher temperature operation. Thus, in design of write elements, tradeoffs are made between the number of winds, yoke length, and write current strength to achieve desired writing performance.

Accordingly, what is desired is an easily fabricated, reliable write element that exhibits a faster flux rise time while minimizing heat problems due to the writing current. In particular, a write element that accommodates a larger number of conductive coil winds for a given yoke length and stack height is needed.

SUMMARY OF THE INVENTION

The present invention provides a magnetic write head and method for making the same that provides high writing performance and can be fabricated with low complexity. Specifically, a write element is provided which includes a conductive coil in the first insulation layer that lies above the first pole.

According to an embodiment of the present invention, a magnetoresistive device for recording data on a magnetic medium includes a first pole formed of magnetic material and having a first pole tip portion at which a first pole pedestal is disposed. A second pole is above the first pole, formed of magnetic material that is connected to the first pole, and has a second pole tip portion aligned with the first pole tip portion, at which a second pole pedestal is disposed. In addition, a write gap is formed between the first and second pole pedestals. The magnetoresistive device also includes a first insulating layer formed of non-magnetic and electrically insulating material above the first pole, as well as a first conductive coil imbedded within the first insulating layer, at least a portion of which lies below all of the second pole. With these locations of the first conductive coil, the stack height can be minimized while maintaining a high number of coils, thereby increasing the reliability of the magnetoresistive device. In addition, other conductive coils can be formed above the first conductive coil to increase the magnetic field strength. With more conductive coils, a stronger magnetic field can be generated at the write gap without increasing the yoke length and with shorter stack height.

In another embodiment of the present invention, a read/write head for exchanging data with a magnetic medium includes a first pole formed of magnetic material and having a first pole tip at which a first pole pedestal is disposed. Also included is a second pole formed of magnetic material above and connected to the first pole, and having a second pole tip at which a second pole pedestal is disposed. The first and second pole pedestals thereby define a write gap therebetween. In addition, the device includes a first conductive coil lying substantially below the second pole, with the first conductive coil forming a write element with the first pole, the second pole, and the write gap. Other elements of the device are a magnetoresistive read sensor positioned below the first pole, and a first shield positioned below the magnetoresistive read sensor, forming a read element with the magnetoresistive read sensor and the first pole. Additionally, the write element and read element can be configured with a medium support that is capable of supporting the medium and moving the medium in relation to a read/write head that includes the write element and the read element. Also, a read/write head support system for suspending the read/write head above the medium can be incorporated.

In yet another embodiment of the present invention, a method for forming a magnetoresistive device for recording information on a magnetic medium includes forming a first pole of magnetic material, having a first pole tip portion, at which a first pole pedestal is formed. The method also includes forming a first conductive coil above and electrically insulated from the first pole. Also, a second pole, having a second pole tip portion, is formed of magnetic material, thereby forming a write gap between the first and second pole pedestals. In this method, at least a portion of the first conductive coil is formed below all of the second pole.

By locating the first conductive coil in accordance with the principals of the present invention, the stack height can be minimized while maintaining a high number of coils, thereby increasing the reliability of the read/write head. In addition, other conductive coils can be formed above the first conductive coil to provide additional magnetic field strength at the write gap without increasing the yoke length or stack height.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, and like reference numerals designate like elements.

DETAILED DESCRIPTION OF THE PREFERRED EMBODIMENTS

Figure 1A:
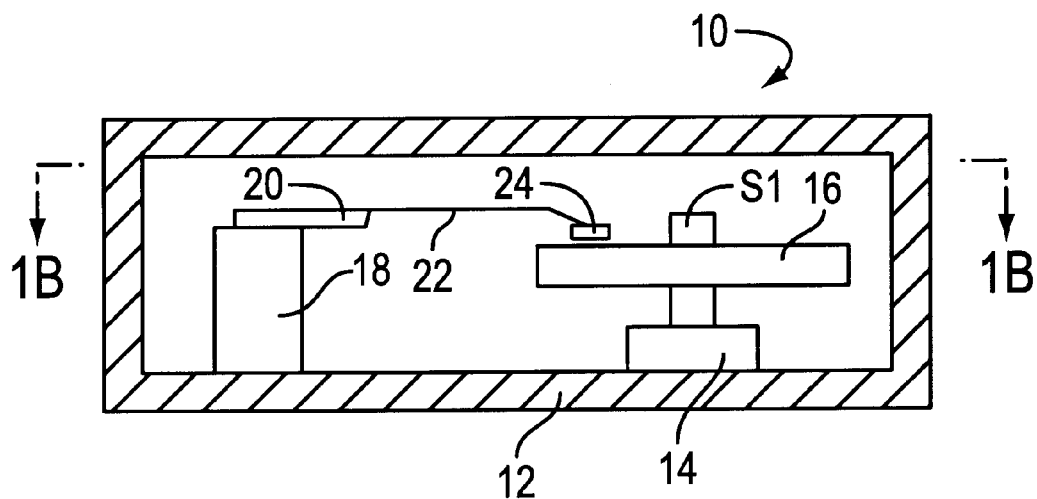
FIG. 1A is a partial cross-sectional front elevation view of a magnetic data storage system.
Figure 1B:
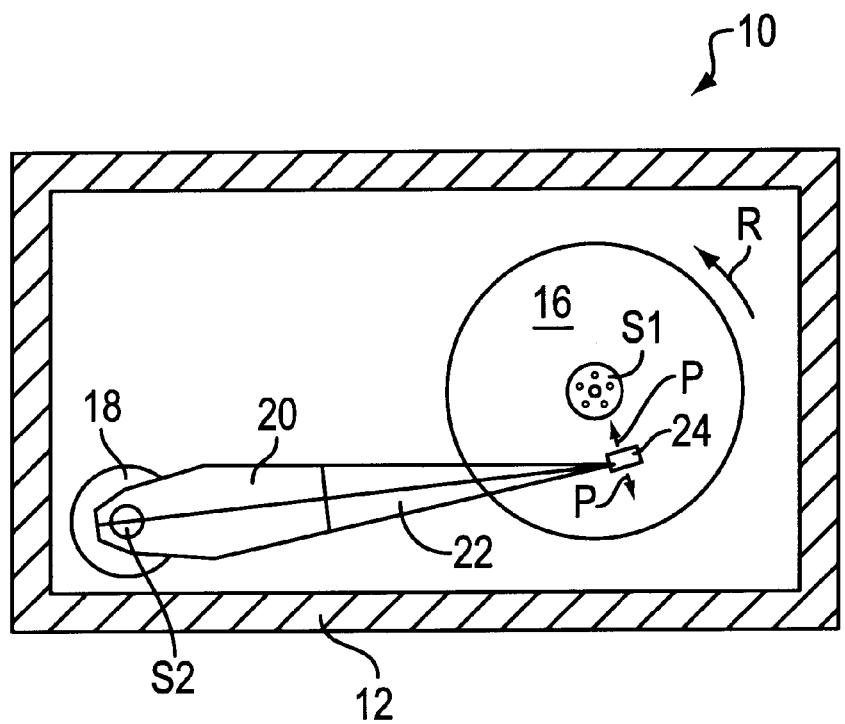
FIG. 1B is a top plan view taken along line 1B—1B of FIG. 1A.

FIGS. 1A–1F were discussed with reference to the prior art. FIG. 2 is a cross-sectional view of a read/write head 54 according to an embodiment of the present invention. The read/write head 54 includes a read element 56 that can be substantially similar to the read element 26 of FIG. 1C. Also included is a write element 58 which includes a first pole 60 and second pole 62 connected by a backgap portion 64. The first and second poles 60 and 62 are preferably formed of magnetic material such as NiFe, FeN, or FeXN (where, for example, X=Ta, Al, or Rh), with materials exhibiting high magnetic moments being desirable. The backgap portion 64 can be formed of the same or similar material as are the first and second poles 60 and 62.

Between and respectively connected to, or integral with, a first pole tip portion 66 of the first pole, and a second pole tip portion 68 of the second pole, are a first pole pedestal 70 and a second pole pedestal 72, respectively. The first pole pedestal 70 and second pole pedestal 72 can be formed of the same or similar material as are the first and second poles 60 and 62, and/or the same or similar material as is the backgap portion 64. For example, the first and second pole pedestals each can be formed of a material different from the other, with the backgap portion being formed of both materials.

The first and second pole pedestals 70 and 72 form a portion of the ABS along the plane 74, and define a write gap 76 between the two. Between the first and second poles 60 and 62 is a first insulation layer 78 in which is imbedded a first conductive coil (sometimes referred to as a first conductive coil layer) 80. The first conductive coil 80 includes multiple winds. While five winds are shown in FIG. 2 by way of illustration, the first conductive coil 80 can have a different number of winds, depending upon the yoke length YL, as well as the size and relative spacing of the winds themselves. Typically, the number of winds is in the range of about 7 to about 15.

Figure 1C:
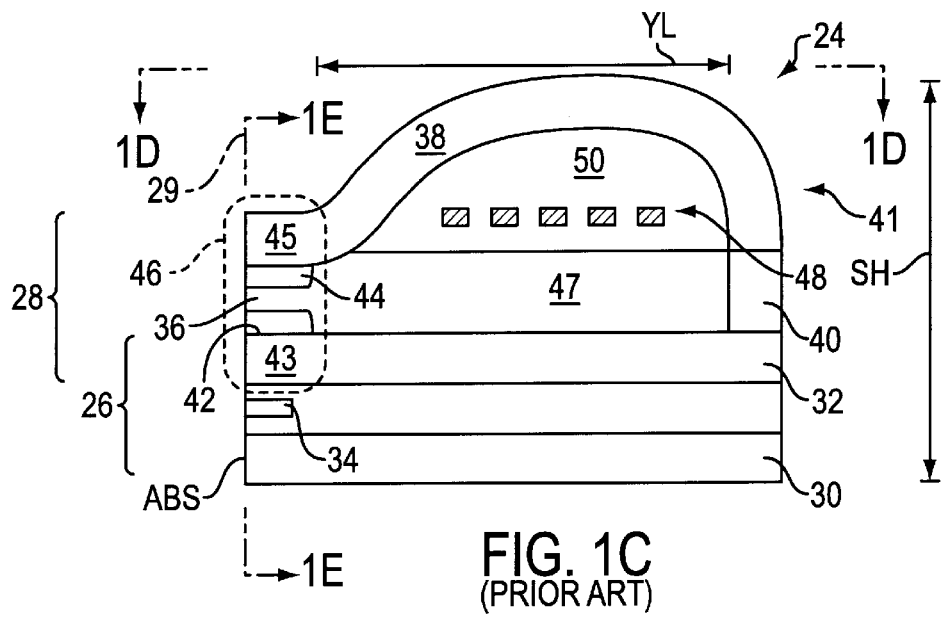
FIG. 1C is a cross-sectional view of a prior art read/write head of the magnetic disk drive assembly of FIGS. 1A and 1B.
Figure 1D:
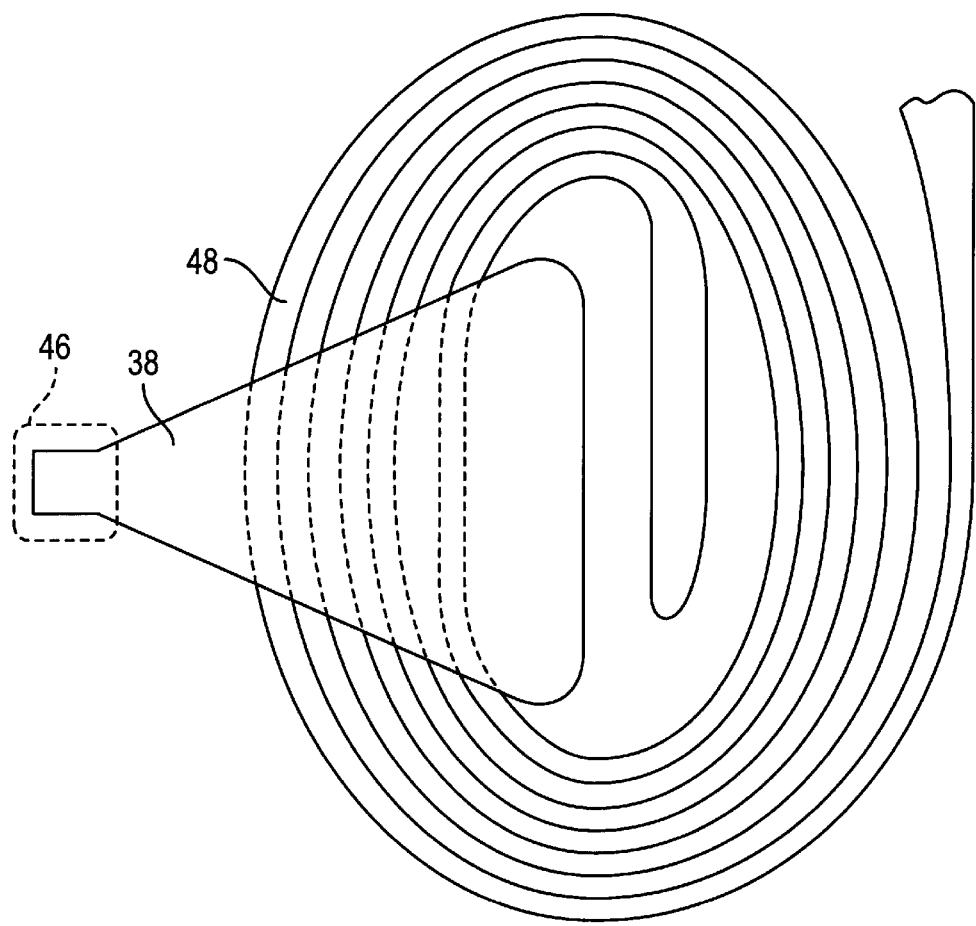
FIG. 1D is a plan view taken along line 1D–1D of FIG. 1C.
Figure 1E:
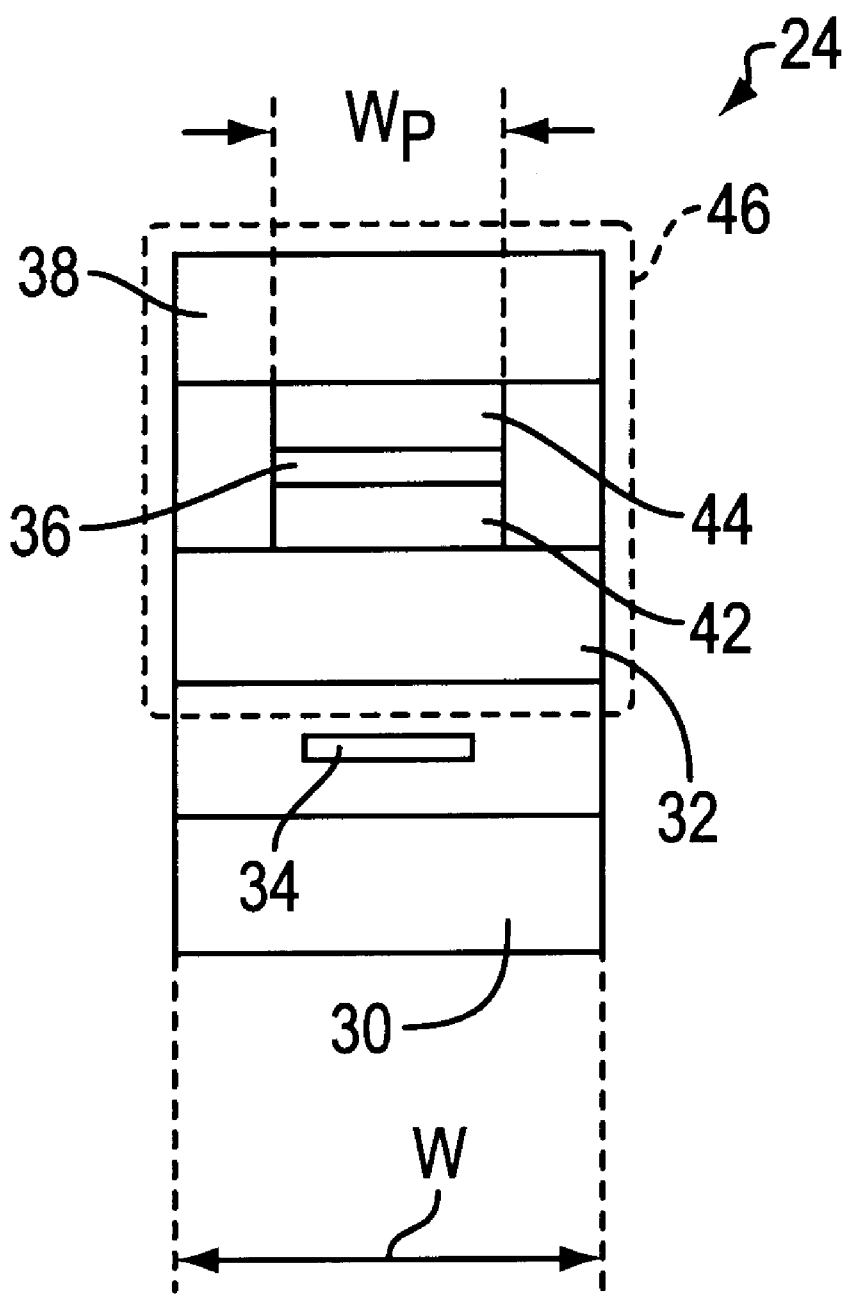
FIG. 1E is a view taken along line 1E—1E of FIG. 1C.
Figure 1F:
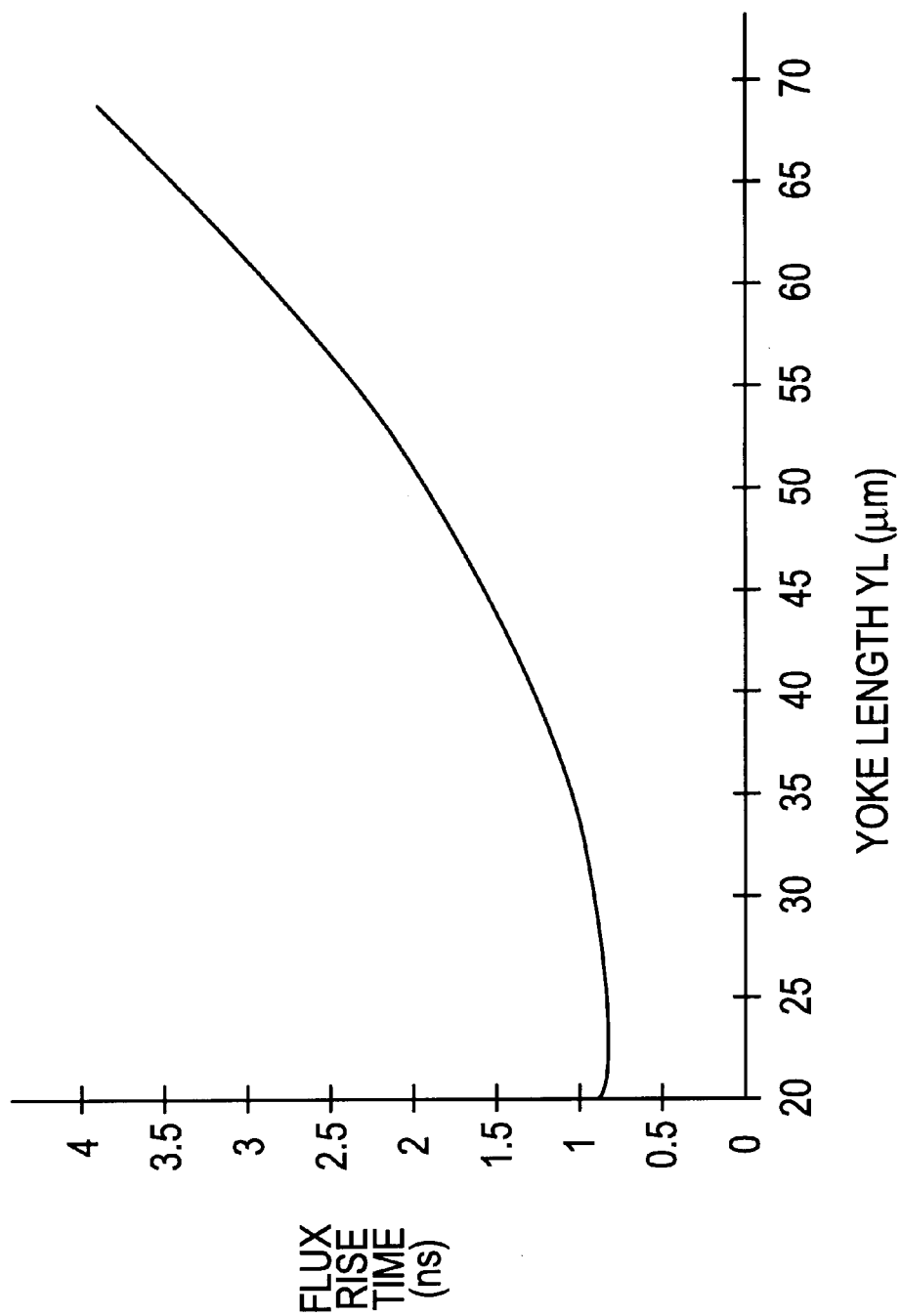
FIG. 1F is a graph illustrating the correlation between yoke length and flux rise time in a write element.
Figure 2:
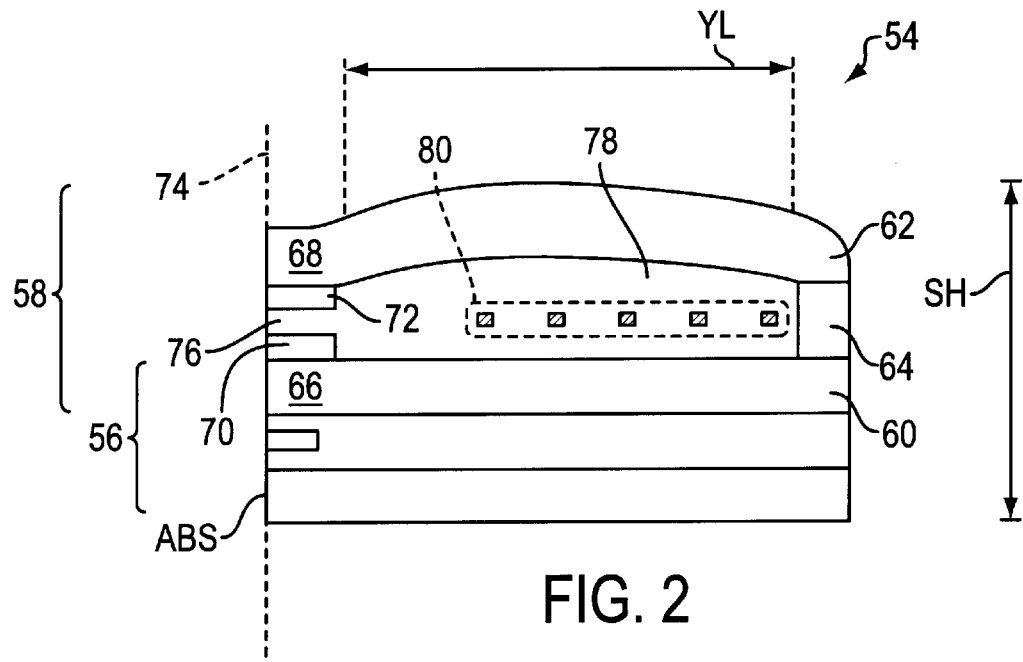
FIG. 2 is a cross-sectional view of a read/write head with one conductive coil, according to an embodiment of the present invention.

As can be seen by comparison with the read/write head 24 of FIG. 1C, with approximately the same number of conductive coils, number of winds, and yoke length, the read/write head of the present invention results in a shorter stack height SH. This is because the first conductive coil 80 is imbedded in the first insulation layer below the second pole 62. Previously, with the first conductive coil being above the first insulation layer and covered with an additional insulation layer, the stack height is increased, and reliability is decreased. By incorporating the principles of the present invention, the performance is maintained, while the shorter stack height provides a more reliable write element with higher production yield.

Figure 3:
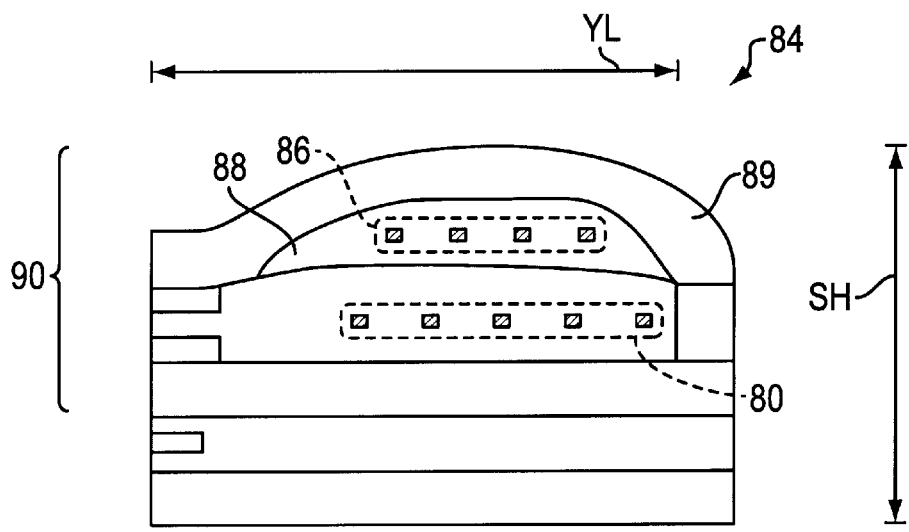
FIG. 3 is a cross-sectional view of a read/write head with two conductive coils, according to an embodiment of the present invention.

FIG. 3 is a cross-sectional view of a read/write head 84, according to another embodiment of the present invention. In addition to the components as described with reference to the read/write head 54 of FIG. 2, the read/write head 84 includes a second conductive coil 86 imbedded within a second insulation layer 88. Unlike the first conductive coil 80, the second conductive coil is not below all of the second pole 89 (i.e., is above part of the second pole 89). Instead, the second pole 89 arches over the second conductive coil 86. Although the stack height SH is thereby increased, the number of winds is increased without increasing yoke length YL. Thus, similar performance and shorter stack height can be realized by the write element 90 with the first conductive coil 80 below essentially all of the second pole 89, as compared to a write element of the prior art having two conductive coils with the same number of winds.

Figure 4:
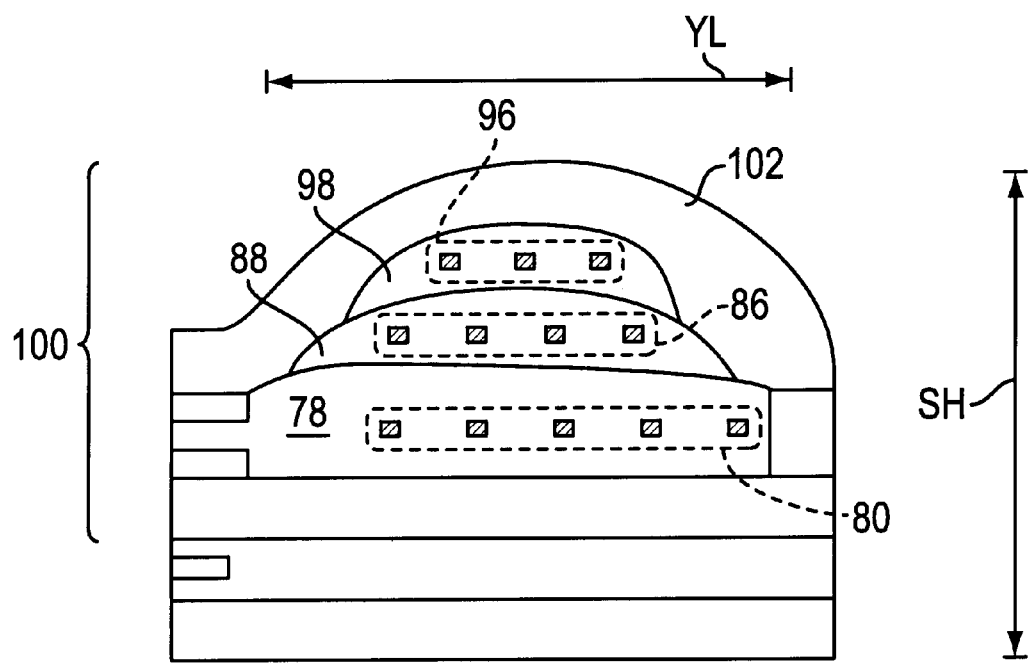
FIG. 4 is a cross-sectional view of a read/write head with three conductive coils, according to an embodiment of the present invention.

FIG. 4 shows a cross-sectional view of a read/write head 94 according to yet another embodiment of the present invention. In this embodiment, a third conductive coil 96 imbedded in a third insulation layer 98 is disposed above a second conductive coil 86 of a write element 100. Again, because the first conductive coil 80 is below all of the second pole 102, more coils, and therefore winds, can be included in the write element 100, with the same yoke length YL and shorter stack height SH than in a prior art read/write head having three conductive coils with the same number of winds. Thus, improved performance (by additional winds) can be achieved with this embodiment of the present invention without sacrificing data rate by increasing the yoke length YL, or sacrificing reliability by increasing stack height SH, as compared to a prior art write head with two conductive coils. Of course, other embodiments of the present invention could include additional layers of conductive coils which would have shorter stack heights, and therefore higher reliability, than prior art write elements with the same number of conductive coils. Alternatively, a shorter yoke length YL can be maintained than in the prior art, while including the same total number of coil winds.

Figure 5:
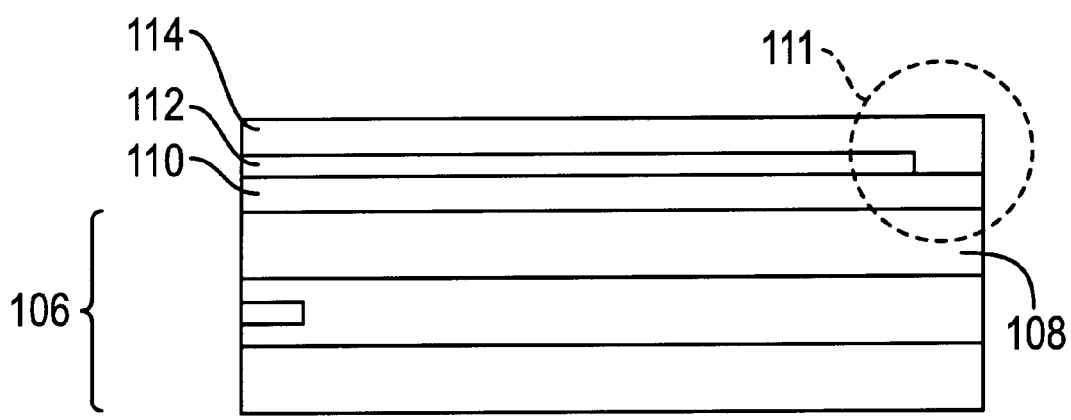
FIGS. 5–11 are cross-sectional views of a read/write head at various stages of fabrication, according to an embodiment of the present invention.

FIG. 5 is a cross-section of a read/write element, with non-integral first and second pedestals, during fabrication. A read element 106 is formed according to methods known to those with skill in the art. This includes the formation of an intermediate layer 108 which serves as both a second shield of the read element 106 and as a first pole. That is, the read element and the write element structurally overlap by sharing the intermediate layer 108. Above the first pole 108 a first magnetic material 110, such as NiFe, FeN, or FeXN is deposited. Patterned photoresistive material ("photoresist"; not shown) is formed over the first magnetic material 110 in a backgap region 111. A write gap material 112 is deposited above the first magnetic material 110, and the photoresist is lifted off. In this way, the first magnetic material 110 is exposed in the backgap region 111. A second magnetic material 114 is deposited over the write gap material 112 and over the exposed portion of the first magnetic material 110. Thus, the first magnetic material 110 and the second magnetic material 114 are magnetically connected in the backgap region 111.

In an alternative embodiment, before deposition of the second magnetic material 114, photoresist can be formed over the write gap material 112 between the yoke tip region and the backgap region 111. The second magnetic material is deposited in the yoke tip region and the backgap region 111, and the photoresist is removed. Thus, the first magnetic material 110 and the second magnetic material 114 are magnetically connected in the backgap region 111.

As a further alternative, no photoresist is formed in the backgap region 111 and the first magnetic material 110 is covered with the write gap material 112. A portion of the write gap material 112 is then removed in the backgap region 111, thereby exposing the first magnetic material 110. The second magnetic material 114 is then deposited over the write gap material 112 and over the exposed portion of the first magnetic material 110. In this way, the first magnetic material 110 and the second magnetic material 114 are magnetically connected in the backgap region 111. Of course other known techniques can also be used to form a structure in the yoke tip region that includes magnetic material separated by non-magnetic material, and a structure in the backgap region that includes magnetic material without separation by a non-magnetic material.

While the second magnetic material 114 can also be formed of NiFe, FeN, or FeXN, the write gap material is formed of a non-magnetic material such as $Al_2O_3$. The deposition of these materials can be performed through known processes, such as sputtering and plating.

Figure 6:
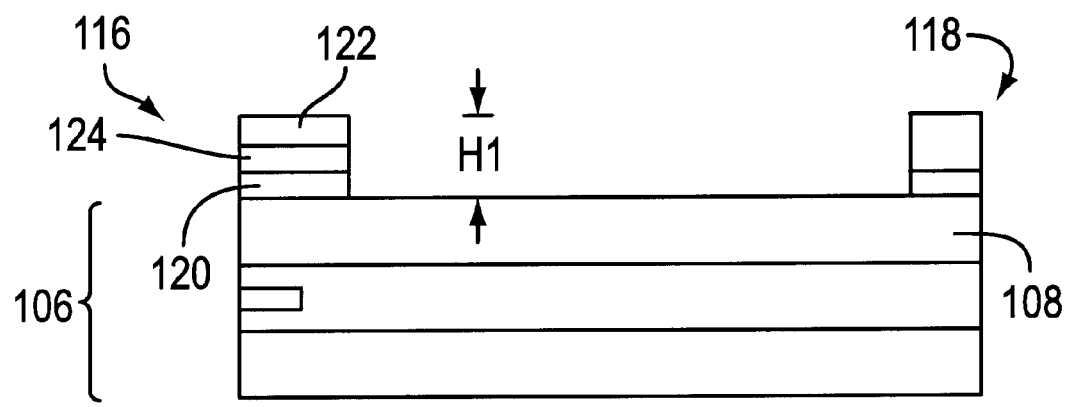

The first magnetic material 110, write gap material 112, and second magnetic material 114 are then etched by known means such as by ion milling, reactive ion beam etching (RIBE), or plasma etching (e.g., reactive ion etching, RIE) to create a yoke tip stitch pole 116, and the backgap portion 118 shown in FIG. 6. Of course, other techniques could be used which would result in different geometries than that illustrated in FIG. 6. Also, it should be understood that alternative techniques can be employed for forming the yoke tip stitch pole 116 and the backgap portion 118. After this etching which exposes the first pole 108, the yoke tip stitch pole 116 includes a first pole pedestal 120 and a second pole pedestal 122, which bound a write gap 124 filled with the write gap material. When formed in this way, the backgap portion 118 and yoke tip stitch pole 116 can have substantially the same height H1. Of course other fabrication processes and techniques can alternatively be used to form the yoke tip stitch pole 116 and backgap portion 118, involving photolithography, wet etching, and plating, for example. In particular, such formation can involve the formation of the first pole pedestal 120 through etching of the first pole 108, without deposition of the first magnetic material 110. In such a case, the first pole pedestal 120 will be integral with the first pole 108. Also, at least a portion of the backgap portion 118 can be formed in a similar manner, and would then be integral with the first pole 108, as well.

Figure 7:
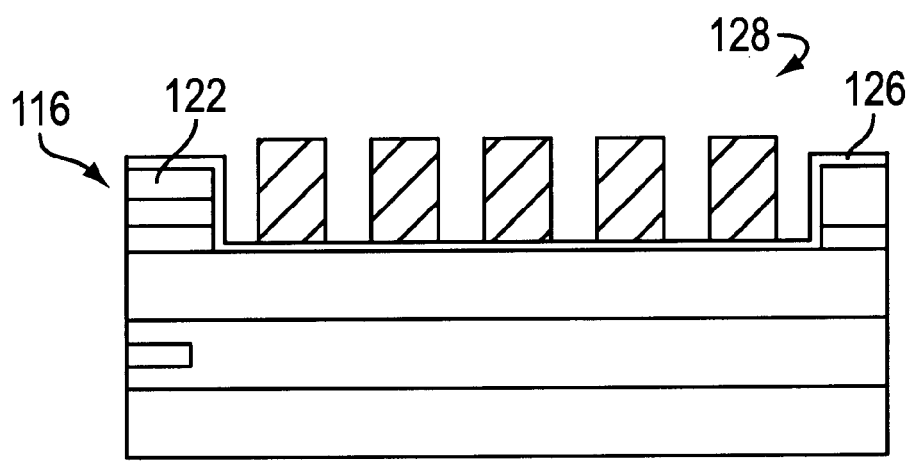

As shown in FIG. 7, a thin separation layer 126 of insulating material is deposited over the exposed first pole 108, the yoke tip stitch pole 116, and the backgap portion 118. This layer is formed of a material that is both non-magnetic and electrically insulating, such as $SiO_2$, SiN, $Al_2O_3$, or AlN, using known appropriate processes, such as chemical vapor deposition (CVD) or physical vapor deposition (PVD). Further, the thin separation layer 126 can have a thickness in the range of about 300 angstroms to about 3000 angstroms. However, it is desired that the thickness of this layer be less than the height H1 of the yoke tip stitch pole 116. On the thin separation layer 126, is formed a first conductive coil 128. A good electrically conductive material such as copper can be used in processes known to those skilled in the art, with appropriate numbers of winds and appropriate relative spacings. While the first conductive layer 128 is shown as extending higher than the second pole pedestal 122, the winds can be shorter.

Figure 8:
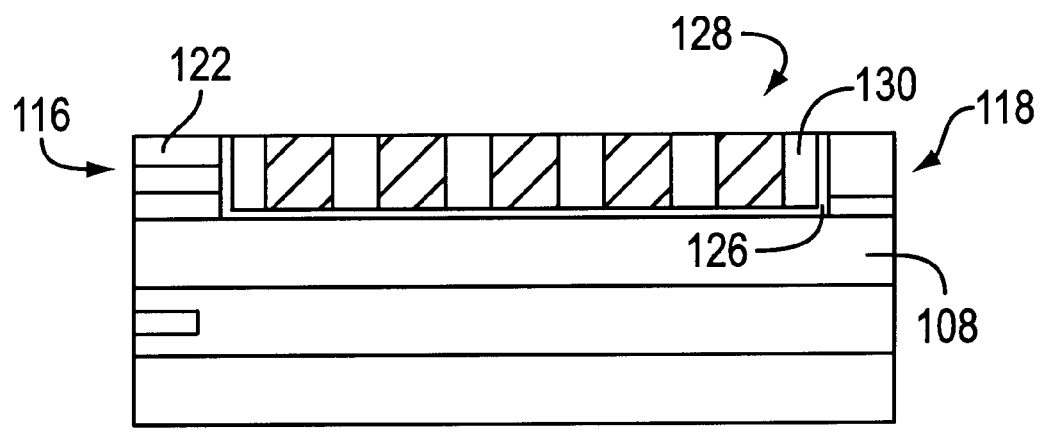

As is shown in FIG. 8, a first insulation layer 130 is deposited over the thin separation layer 126 and the first conductive coil 128 and then planarized. The first insulation is formed of a non-magnetic and electrically insulating material, such as $Al_2O_3$, SiN, or $SiO_2$, and deposited with known techniques appropriate to the materials, such as CVD or PVD. This planarization can be accomplished with known methods, such as by chemical mechanical polishing (CMP). Thereby, the second pole pedestal 122 and the backgap portion 118 are exposed. In the case shown, where the first conductive coil 128 was formed to extend higher than the second pole pedestal 122, the planarization also exposes the first conductive coil 128. If the first conductive coil 128 was formed to rise above the first pole 108 less than the yoke tip stitch pole 116, this planarization might not expose the first conductive coil 128, but leave it covered with the first insulation layer 130.

Figure 9:
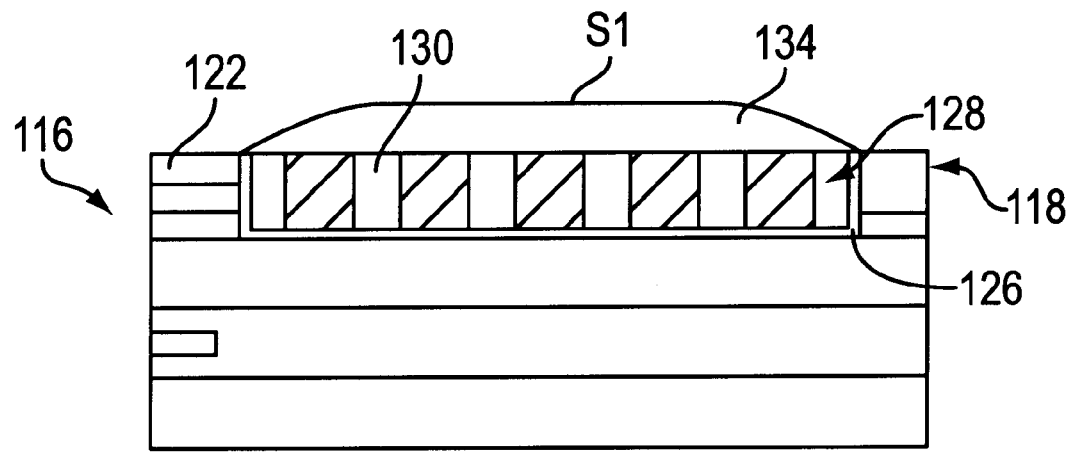

FIG. 9 shows the addition of an intermediate insulation layer 134 over the first conductive coil 128, which is not needed if the conductive coil is still covered with the first insulation layer after its planarization. The intermediate insulation layer 134 is formed of a non-magnetic and electrically insulating material, which can be inorganic or organic. If organic, this layer can be cured, resulting in the sloping of an upper surface S1 of the intermediate insulation layer 134.

Figure 10:
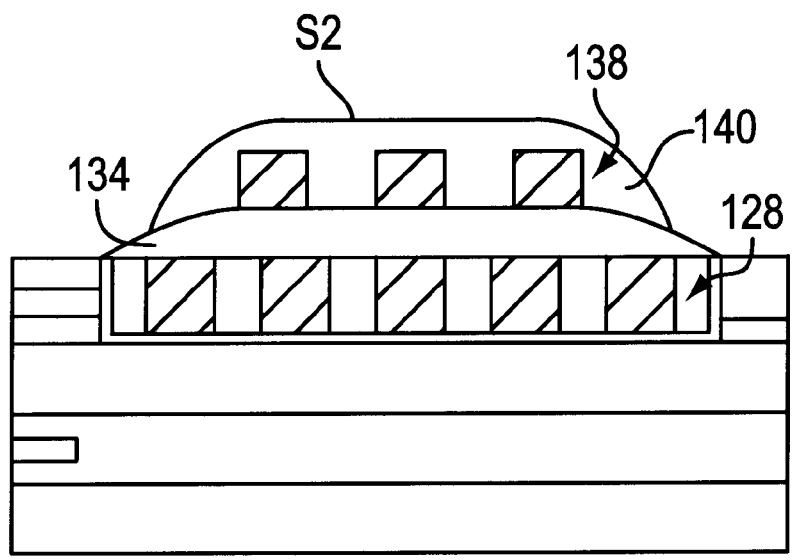

A second conductive coil 138 is formed over the first conductive coil 128 and covered with a second insulation layer 140, as is shown in FIG. 10. The second conductive coil 138 is formed of a highly electrically conductive material as is the first conductive coil 128. Although the second insulation layer 140 can be formed of a non-magnetic and electrically insulating material, if an organic material with such properties is used, it can be cured to slope the surface S2 of the layer. Such sloping can enhance the boundary coherence of the intermediate insulation layer 134 and the second insulation layer 140, with a subsequently formed second pole discussed below with reference to FIG. 11.

Figure 11:
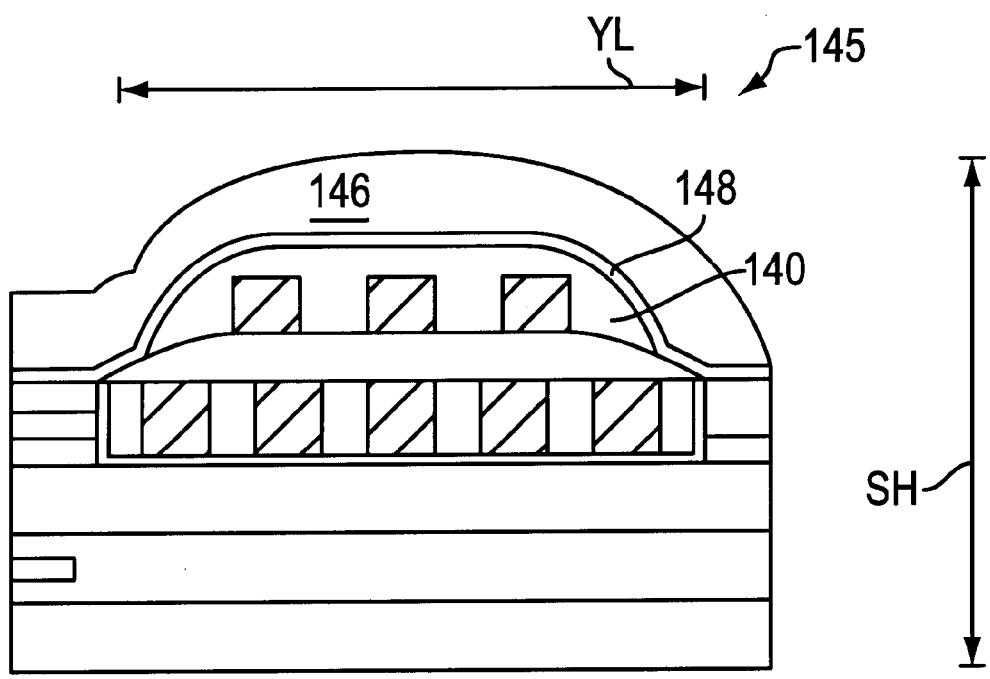

FIG. 11 shows a read/write head 145 with a second pole 146 formed over the second insulation layer 140. As shown, the read/write head 145 includes a seed layer 148 deposited, for example by sputtering (i.e., PVD), between the second insulation layer 140 and the second pole 146. The seed layer can be formed of materials such as Ni, NiFe, or CoFe, according to the material to be used in the second pole 146, to a thickness of about 1000 angstroms. Alternatively, the second pole could be formed through sputtering, without the inclusion of the seed layer 148. The second pole 146 can be formed of any suitable magnetic material, such as NiFe, FeN, FeRhN, FeAlN, FeTaN, or FeAlSi. Thus, in the read/write head 145, the formation of the first conductive coil below the second pole, allows additional coil winds to be included in the write element without increasing either yoke length or stack height.

Figure 12:
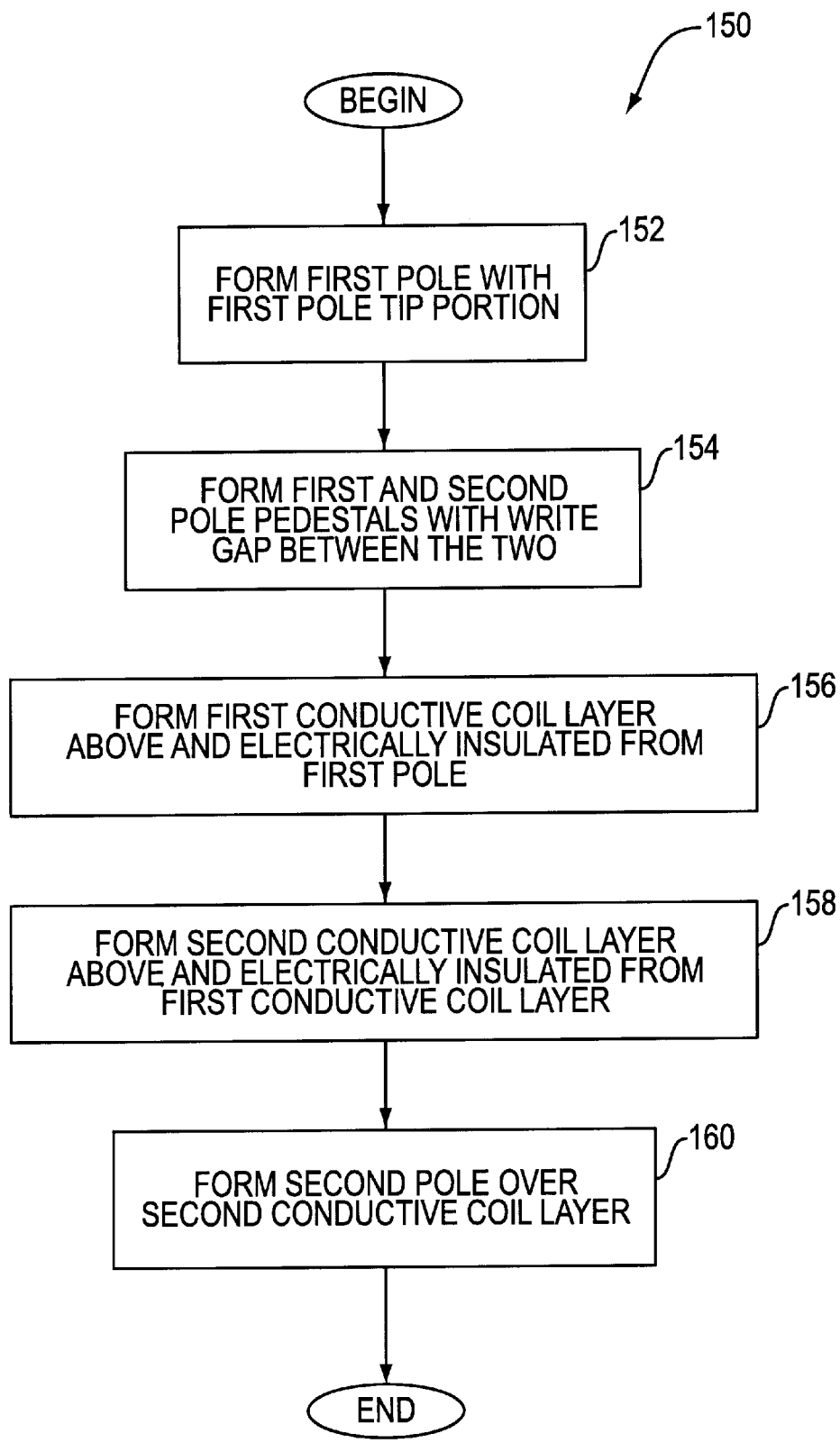
FIG. 12 is a process diagram of a method of fabricating a read/write head with two conductive coils, according to an embodiment of the present invention.

FIG. 12 is a flow diagram of a method 150 for fabricating a write element according to an embodiment of the present invention. In operation 152, a first pole with a first pole tip portion is formed. This first pole can be formed by deposition of magnetic material, such as NiFe, FeN, or FeXN on a substrate. In some embodiments, the first pole can be formed over a read element. Further, in such configurations, the first pole can also act as a second shield of the read element.

First and second pole pedestals, with a write gap between the two, are formed in operation 154. The two pole pedestals and write gap form a yoke tip stitch pole, the formation of which is further discussed below with reference to FIG. 13. In operation 156, a first conductive coil is formed above and electrically insulated from the first pole, while a second conductive coil is formed above and electrically insulated from the first conductive coil in operation 158. After the second conductive coil is formed in operation 158, a second pole is formed above the second conductive coil in operation 160.

Figure 13:
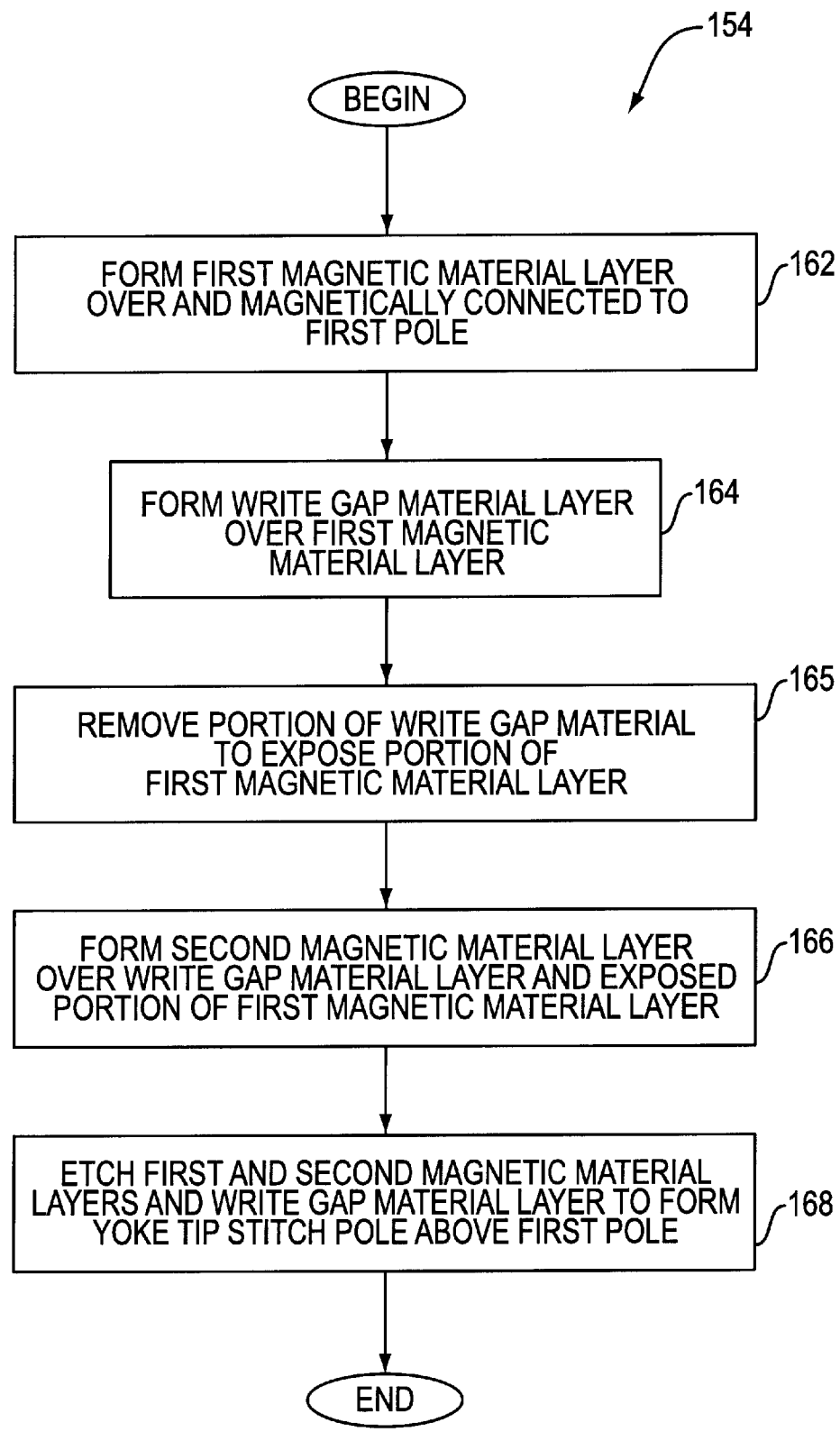
FIG. 13 is a process diagram of a method of performing a portion of the method of FIG. 12, according to an embodiment of the present invention.

FIG. 13 further illustrates the operation 154 of the method 150 in FIG. 12. A first magnetic material layer, formed of a material such as FeN, FeRhN, FeAlN, FeTaN, or CoNiFe, is formed over and magnetically connected to the first pole in operation 162. Operation 164 includes the forming of a write gap material layer over the first magnetic material layer formed in operation 162. The write gap material is a non-magnetic and electrically insulating material such as $Al_2O_3$ or other oxides. In operation 165, a portion of the write gap material layer is removed to expose a portion of the first magnetic material layer. For example, photoresistive material can be deposited and patterned above the write gap material layer, followed by the etching of the write gap material layer, and subsequent removal of the photoresistive material. Further, in operation 166, a second magnetic material layer is formed over the write gap material layer and the exposed portion of the first magnetic material layer. This results in the first and second magnetic material layers being magnetically connected. Each of the first magnetic material layer, write gap material layer, and second magnetic material layer are etched to form a yoke tip stitch pole above the first pole in operation 168. Any known suitable etching technique can be used, such as ion milling or RIBE. With this etching, the first yoke is exposed, and a backgap stitch pole, or portion, is also formed. While this etching can form a yoke tip stitch pole with vertical sides adjacent to the first pole, these sides can alternatively include one or more angled walls. Also, it should be understood that other processes can be employed to form the backgap portion and to magnetically connect the first and second magnetic layers.

Figure 14:
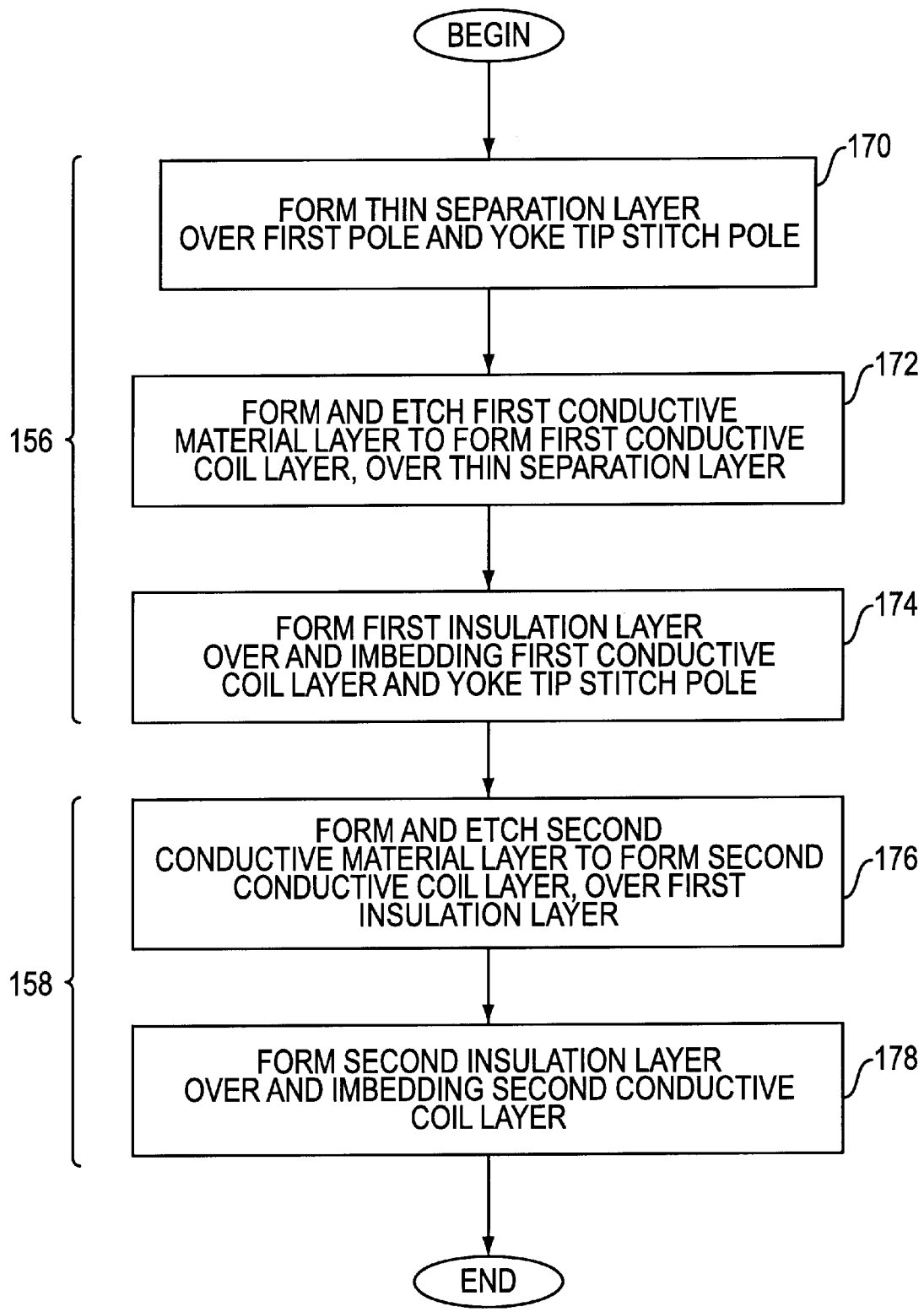
FIG. 14 is a process diagram of a method of performing another portion of the method of FIG. 12, according to an embodiment of the present invention.

FIG. 14 further elaborates on the operations 156 and 158 of the method 150 of FIG. 12. Operation 170 includes the formation of a thin separation layer over the exposed first pole and the yoke tip stitch pole. In addition, this formation can also cover the backgap portion with the thin separation layer. The thin separation layer is formed of a non-magnetic and electrically insulating material, with known processes such as CVD or PVD. Materials such as $SiO_2$, $SiN_x$, $Al_2O_3$, or AlN can be used with a thickness in the range of about 300 angstroms to about 3000 angstroms. In operation 172, a conductive material layer is formed over the thin separation layer formed in operation 170, and then etched to form a first conductive coil. Deposition and etching techniques, such as ion milling or RIE, known to those skilled in the art can be used with highly electrically conductive materials, such as copper or gold. Of course, as one possible alternative, the conductive coil can be formed by depositing a seed layer and then photo masking to define trenches. A conductive material is then plated in the trenches to form the coil winds. The photo mask is then stripped and the seed layer is removed using known techniques such as ion milling or wet etching.

Over and imbedding this first conductive coil, a first insulation layer is formed in operation 174. An insulating material such as $SiO_2$ or SiN, is formed over the first conductive coil using known processes and planarized to expose the yoke tip stitch pole and the backgap portion. With the first conductive coil below the second pole, additional coil winds can be included without increasing either yoke length or stack height.

Operation 158 of method 150 includes forming and etching a second conductive material layer over the first insulation layer to form a second conductive coil. Similar techniques and materials can be used as in the formation of the first conductive coil in operation 172. In operation 178, a second insulation layer is formed over and imbeds the second conductive coil. Here, an inorganic or organic non-magnetic and electrically insulating material can be deposited using known suitable techniques. If organic materials are used, it can be cured to slope the surface of the second insulation layer, thereby promoting sufficient boundary coherence between the first and second insulation layers and the second pole.

It should be understood that, although embodiments have been described and/or illustrated as including a particular number of conductive coils, each of the embodiments of the present invention can also include additional conductive coils above those described.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A magnetoresistive device for recording data on a magnetic medium, comprising:

a first pole formed of magnetic material and having a substantially planar top surface and a first pole tip portion;

a first pole pedestal formed of magnetic material disposed above said first pole tip portion;

a second pole having an arc portion, a bottom surface, and a second pole tip portion aligned with said first pole tip portion, said second pole being formed of magnetic material that is connected to said first pole by a backgap portion distal said second and first pole tip portions, wherein said backgap portion has a top surface connected to said second pole;

a second pole pedestal having a top surface and formed of magnetic material disposed below said second pole tip portion such that said top surface of said second pole pedestal is proximate to said second pole tip portion, wherein a write gap is defined between said first pole pedestal and said second pole pedestal, and wherein a first plane is substantially coplanar with both said top surface of said second pole pedestal and said top surface of said backgap portion;

a first insulating layer formed of non-magnetic and electrically insulating material disposed between said top surface of said first pole and said second pole;

a first conductive coil imbedded within said first insulating layer, wherein said first conductive coil is disposed between said top surface of said first pole and said first plane;

a second insulating layer formed of non-magnetic and electrically insulating material disposed between said first insulating layer and said second pole; and a second conductive coil imbedded within said second insulating layer and disposed between said first plane and said bottom surface of said arc portion of said second pole.

2. The magnetoresistive device as recited in claim 1, wherein said first conductive coil lies substantially in a same plane as said write gap.

3. The magnetoresistive device as recited in claim 1, wherein said first conductive coil lies substantially above said write gap.

4. The magnetoresistive device as recited in claim 1, wherein said first conductive coil lies substantially below said write gap.

5. The magnetoresistive device as recited in claim 1, further comprising a third conductive coil above said second conductive coil.

6. A magnetoresistive device for exchanging data with a magnetic medium, comprising:

a first pole formed of magnetic material and having a substantially planar top surface and a first pole tip portion;

a first pole pedestal formed of magnetic material disposed above said first pole tip portion;

a second pole having an arc portion, a bottom surface, and a second pole tip portion aligned with said first pole tip portion, said second pole being formed of magnetic material that is connected to said first pole by a backgap portion distal said first and second poles tip portions, wherein said backgap portion has a top surface connected to said second pole;

a second pole pedestal having a top surface and formed of magnetic material disposed below said second pole tip portion such that said top surface of said second pole pedestal is proximate to said second pole tip portion, wherein a write gap is defined between said first pole pedestal and said second pole pedestal, and wherein a first plane is substantially coplanar with both said top surface of said second pole pedestal and said top surface of said backgap portion;

a first conductive coil imbedded within a first insulating layer, wherein said first conductive coil is disposed between said top surface of said first pole and said first plane, and wherein said first conductive coil forms a portion of a write element with said first pole and said second pole;

a second insulating layer formed of non-magnetic and electrically insulating material disposed between said first insulating layer and said second pole;

a second conductive coil imbedded within said second insulating layer and disposed between said first plane and said bottom surface of said arc portion of said second pole;

a magnetoresistive read sensor positioned below said first pole; and a first shield positioned below said magnetoresistive read sensor, forming a portion of a read element with said magnetoresistive read sensor and said first pole.

7. A magnetoresistive device as recited in claim 6, further comprising:

a medium support that is capable of supporting said medium and moving said medium in relation to a read/write head that includes said write element and said read element; and a read/write head support system for suspending said read/write head above said medium.

8. The magnetoresistive as recited in claim 7, wherein said read/write head support system includes means for moving said read/write head relative to said medium.

9. The magnetoresistive device as recited in claim 7, wherein said medium support includes:

a spindle on which said medium can be supported, having an axis about which said medium can rotate; and a medium motor connected to said spindle and capable of facilitating said moving of said medium relative to said read/write head.

10. The magnetoresistive device as recited in claim 7, wherein said first conductive coil lies in a plane including said write gap.

11. The magnetoresistive device as recited in claim 10, further comprising a third conductive coil disposed between said second conductive coil and said second pole.

* * * * *

UNITED STATES PATENT AND TRADEMARK OFFICE
CERTIFICATE OF CORRECTION

PATENT NO. : 6,178,070 B1
DATED : January 23, 2001
INVENTOR(S) : Hong et al.

It is certified that error appears in the above-identified patent and that said Letters Patent is hereby corrected as shown below:

Column 9,
Line 49, change "SiN" to -- $SiN_x$ --.

Column 12,
Line 14, in the preamble to claim 8, change "magnetoresistive", to -- magnetoresistive device --.

Signed and Sealed this

Twenty-sixth Day of March, 2002

Attest:

Attesting Officer

JAMES E. ROGAN
*Director of the United States Patent and Trademark Office*